US012683206B2

(12) United States Patent
Bhatt et al.

(10) Patent No.: US 12,683,206 B2
(45) Date of Patent: Jul. 14, 2026

(54) ELECTROLYTE RECOVERY

(71) Applicant: Commonwealth Scientific and Industrial Research Organisation, Acton (AU)

(72) Inventors: Anand I. Bhatt, Mulgrave (AU); Thomas Rüther, Highett (AU); Yanyan Zhao, Glen Waverley (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 957 days.

(21) Appl. No.: 17/772,924

(22) PCT Filed: Jun. 2, 2021

(86) PCT No.: PCT/AU2021/050548
§ 371 (c)(1),
(2) Date: Apr. 28, 2022

(87) PCT Pub. No.: WO2021/258128
PCT Pub. Date: Dec. 30, 2021

(65) Prior Publication Data
US 2022/0399589 A1      Dec. 15, 2022

(30) Foreign Application Priority Data
Jun. 24, 2020    (AU) ................................ 2020902099

(51) Int. Cl.
*H01M 10/00* (2006.01)
*H01M 10/0525* (2010.01)
(Continued)

(52) U.S. Cl.
CPC ....... *H01M 10/54* (2013.01); *H01M 10/0525* (2013.01); *H01M 10/0569* (2013.01);
(Continued)

(58) Field of Classification Search
CPC ............. H01M 10/54; H01M 10/0525; H01M 10/0569; H01M 2300/0051; H01M 2300/0037
See application file for complete search history.

(56) References Cited

U.S. PATENT DOCUMENTS

| 2016/0043437 A1 | 2/2016 | Boll et al. |
| 2020/0155964 A1 | 5/2020 | Singh et al. |

FOREIGN PATENT DOCUMENTS

| CN | 108288737 A | 7/2018 |
| CN | 108631017 A | 10/2018 |

(Continued)

OTHER PUBLICATIONS

Liu et al, A waste battery electrolyte recycling method, Jan. 2019, see the abstract. (Year: 2019).*

(Continued)

*Primary Examiner* — Tiffany Legette
*Assistant Examiner* — Monique M Wills
(74) *Attorney, Agent, or Firm* — Crowell & Moring LLP

(57) ABSTRACT

The invention provides a method of recovering a lithium electrolyte salt from a used electrolyte, the method comprising: contacting a used electrolyte comprising a lithium electrolyte salt and electrolyte solvent with a polar aprotic solvent to produce a solution comprising the lithium electrolyte salt, the electrolyte solvent and the polar aprotic solvent, wherein at least one of the electrolyte solvent and the polar aprotic solvent comprises carbonate solvent, combining the solution with a precipitation solvent in which the lithium electrolyte salt is poorly soluble; precipitating a precipitated composition comprising the lithium electrolyte salt solvated by the carbonate solvent from a solvent mixture comprising the polar aprotic solvent, the precipitation solvent and the electrolyte solvent, wherein the precipitated composition precipitates as a solid or as a liquid; and (Continued)

separating the precipitated composition from the solvent mixture.

26 Claims, 4 Drawing Sheets

(51) Int. Cl.
  *H01M 10/0569* (2010.01)
  *H01M 10/54* (2006.01)
(52) U.S. Cl.
  CPC ............... *H01M 2300/0037* (2013.01); *H01M 2300/0051* (2013.01)

(56) References Cited

FOREIGN PATENT DOCUMENTS

| | | | | | |
|---|---|---|---|---|---|
| CN | 109193062 A | * | 1/2019 | ........... | H01M 10/54 |
| CN | 109292746 A | | 2/2019 | | |
| FR | 3024288 A1 | * | 1/2016 | ........ | H01M 10/0525 |

OTHER PUBLICATIONS

Billy et al, Method for Recycling the Electrolyte of a Li-Ion Battery and Method for Recycling Li-Ion Batteries, Jan. 2016, see the abstract. (Year: 2016).*
Search Report Received in European Application No. 21829157.3, dated Sep. 29, 2023 (24 pages).
Machine Translation of CN Patent No. 108288737 A (3 pages).
Machine Translation of CN Patent No. 109292746 A (4 pages).
Xin, Nan, et al., "Solubilities of Six Lithium Salts in Five Non-Aqueous Solvents and in a Few of Their Binary Mixtures" *Fluid Phase Equilibria*, Dec. 28, 2017, vol. 461 (7 pages).
International Search Report for corresponding PCT Application No. PCT/AU2021/050548 dated Aug. 24, 2021.
Written Opinion of the International Searching Authority for corresponding PCT Application No. PCT/AU2021/050548 dated Aug. 24, 2021.
Chinese-language Office Action issued in Chinese Application No. 202180006634.6 dated Dec. 8, 2025, with English machine-translation (18 pages).

* cited by examiner

ELECTROLYTE RECOVERY

RELATED APPLICATIONS

This application is a U.S. National Phase entry under 35 U.S.C. § 371 of International Application No. PCT/AU2021/050548, filed 2 Jun. 2021, which claims priority to Australian Patent Application No. 2020902099, filed 24 Jun. 2020, the contents of which are incorporated herein by reference in their entirety.

TECHNICAL FIELD

The present invention relates to a method of recovering a lithium electrolyte salt from a used electrolyte, the method comprising contacting the used electrolyte with a polar aprotic solvent to produce a solution comprising the lithium electrolyte salt, electrolyte solvent and the polar aprotic solvent, wherein the solution comprises a carbonate solvent; combining the solution with a precipitation solvent in which the lithium electrolyte salt is poorly soluble; precipitating a precipitated composition comprising lithium electrolyte salt solvated by the carbonate solvent; and separating the precipitated composition from the solvent mixture. The invention also relates to a method of recycling a lithium electrolyte salt from an electrochemical energy storage device, and to a method of producing an electrolyte for an electrochemical energy storage device.

BACKGROUND OF INVENTION

Electrochemical energy storage devices such as lithium ion batteries (LIBs) are now ubiquitous in society, with applications ranging from portable electronics to vehicle transportation and domestic energy storage. As these devices reach the end of their useful lives, an increasingly large amount of LIB waste is being generated. It is estimated that about 3,300 tonnes of LIB waste were generated in Australia in 2016 and it is projected based on expected electric vehicle adoption only that this may reach 180,000 tonnes by 2035. Currently, lithium ion batteries are not routinely recycled, and there is an increasing environmental and economic incentive to improve the recovery of resources from LIB waste.

LIB waste contains valuable resources like cobalt (Co), lithium (Li), base and other metals and graphite, all of which could be recovered and reused to manufacture new products. Given the commodity value of Co, global recycling has focussed predominantly on the recovery of this metal. More recently, recycling processes have also sought to recover other critical and strategic metals such as Cu, Ni and Li.

Metals can be recovered from waste LIBs using pyrometallurgy or hydrometallurgy-based methods. Pyrometallurgical methods recover high value metals such as nickel and cobalt, while leaving other metals such as lithium, manganese and aluminium in the slag phase. Hydrometallurgical methods rely on the use of strong inorganic or organic acids and alkalis to dissolve the solid metal fraction of waste streams. Lithium may thus be recovered from the cathode active material of LIB wastes, but only in the form of $Li_2CO_3$, LiOH and the like. Dissolved lithium salts present in the LIB electrolyte system are not recovered by either pyrometallurgical or hydrometallurgical methods.

The net value of recovered metals would be increased if it were possible to recover materials in a form that is ready to use in battery manufacturing. However, the high purity requirements of battery material manufacturers make this approach challenging.

A considerable fraction of the lithium in LIB waste is present as lithium electrolyte salts, most commonly lithium hexafluorophosphate ($LiPF_6$), in an electrolyte solvent matrix which is typically composed of two to three different alkyl carbonates. $LiPF_6$ is a high value material ($US ay. 55,000/t battery grade) making its recovery particularly attractive. Moreover, the industrial scale synthesis of high purity $LiPF_6$ from lithium carbonate or lithium hydroxide, obtained after mineral processing or hydrometallurgical recycling of LIB wastes, is challenging and involves the use of toxic and environmentally harmful chemicals such as pentafluorophosphate ($PF_5$), pentachlorophosphate ($PCl_5$) and hydrofluoric acid (HF) gases. Therefore, a combination of factors including price, accessibility on large scale and HSE concerns are drivers of new technology that could recycle lithium electrolyte salts from LIBs for reuse, rather than recovering the lithium as lithium carbonate or lithium hydroxide.

Processes for post-synthesis purification of $LiPF_6$ have been reported, for example in WO1999062821A1. This process seeks to provide high purity, unsolvated $LiPF_6$ with low total organic content (TOC), and thus teaches that recrystallisation of $LiPF_6$ should be conducted under conditions where the solubilising solvent is removed by distillation. The high temperatures and/or vacuum conditions that this requires, particularly where a high boiling point solubilising solvent is used, add to the process cost and complexity and increase the likelihood of decomposing the $LiPF_6$ product.

While the above discussion has focused on $LiPF_6$, it will be appreciated that similar considerations apply to other lithium electrolyte salts including lithium tetrafluoroborate ($LiBF_4$), lithium bis(fluorosulfonyl)imide (LiFSI), lithium bis(trifluoromethanesulfonyl)imide (LiTFSI), lithium (fluorosulfonyl)(trifluoromethanesulfonyl)imide (LiFTFSI), lithium bis(oxalato)borate (LiBOB), lithium oxalyldifluoroborate (LiODFB), lithium fluoroalkylphosphate (LiFAP) and the like.

There is therefore an ongoing need for new methods of recovering a lithium electrolyte salt from a used electrolyte or electrochemical energy storage device which at least partially address one or more of the above-mentioned shortcomings, or provide a useful alternative.

A reference herein to a patent document or other matter which is given as prior art is not to be taken as an admission that the document or matter was known or that the information it contains was part of the common general knowledge as at the priority date of any of the claims.

SUMMARY OF INVENTION

In accordance with a first aspect the invention provides a method of recovering a lithium electrolyte salt from a used electrolyte, the method comprising: contacting a used electrolyte comprising a lithium electrolyte salt and electrolyte solvent with a polar aprotic solvent to produce a solution comprising the lithium electrolyte salt, the electrolyte solvent and the polar aprotic solvent, wherein at least one of the electrolyte solvent and the polar aprotic solvent comprises carbonate solvent; combining the solution with a precipitation solvent in which the lithium electrolyte salt is poorly soluble; precipitating a precipitated composition comprising the lithium electrolyte salt solvated by the carbonate solvent from a solvent mixture comprising the polar aprotic solvent, the precipitation solvent and the electrolyte solvent, wherein the precipitated composition precipitates as a solid or as a liquid; and separating the precipitated composition from the solvent mixture.

The invention thus provides a readily implemented and scalable method of recovering and recycling lithium electrolytes salts such as $LiPF_6$ from used electrochemical energy storage devices. By targeting a solvated lithium electrolyte salt, it was found that elevated temperatures and reduced pressures are not required to obtain a high purity product. Moreover, the inventors have recognised that electrolytes produced from high purity carbonate-solvated lithium electrolyte salts will be indistinguishable from electrolytes produced using newly-synthesized, solvent-free salts when the electrolyte utilises a carbonate solvent matrix.

Surprisingly, it was also found that high purity lithium electrolyte salts solvated exclusively by ethylene carbonate (EC), for example $Li(EC)_nPF_6$ where the average value of n is in the range of about 4 to 5, can be produced even when other carbonate solvent molecules are present in solution before or during the lithium precipitation step. Since ethylene carbonate is the most common carbonate molecule present in lithium ion batteries, the recovered lithium electrolyte salts are readily applied in the preparation of new electrolytes for electrochemical energy storage devices.

In some embodiments, the precipitated composition precipitates as a solid.

In some embodiments, the lithium electrolyte salt is $LiPF_6$.

In some embodiments, both the electrolyte solvent and the polar aprotic solvent comprise carbonate solvent.

In some embodiments, at least one of the electrolyte solvent and the polar aprotic solvent comprises ethylene carbonate. In some embodiments, the electrolyte solvent comprises ethylene carbonate.

In some embodiments, the polar aprotic solvent comprises at least one selected from dimethyl carbonate, ethyl methyl carbonate, diethyl carbonate. In some embodiments, the polar aprotic solvent comprises dimethyl carbonate.

In some embodiments, the precipitated composition comprises $LiPF_6$ solvated by, or exclusively solvated by, ethylene carbonate. The precipitated composition may comprise $Li(ethylene\ carbonate)_nPF_6$, where n is the ratio of coordinated solvent to lithium. In some embodiments, the average value of n is in the range of about 4 to 5.

In some embodiments, the used electrolyte is present in an electrochemical energy storage device, or a component or derivative thereof, and contacting the used electrolyte with the polar aprotic solvent comprises extracting the electrochemical energy storage device, or the component or derivative thereof, with the polar aprotic solvent.

In some embodiments, the precipitation solvent has lower polarity than the polar aprotic solvent.

In some embodiments, the solution and the precipitation solvent combine to form the solvent mixture as a single liquid phase.

In some embodiments, the precipitation solvent comprises a hydrocarbon solvent or a chlorinated solvent.

In some embodiments, the precipitation solvent has a normal boiling point of below 120° C., such as below 100° C.

In some embodiments, the solution and the precipitation solvent are combined at a ratio (v/v) of between 1:2 and 1:100, or between 1:3 and 1:20, such as between 1:4 and 1:15.

In some embodiments, the combining and the precipitating are conducted at temperatures below 50° C., or below 30° C., such as at or below ambient temperature.

In some embodiments, precipitating the precipitated composition comprises cooling the solvent mixture to a temperature below 10° C., such as below 0° C.

In some embodiments, the method further comprises removing solid impurities from the solution before combining the solution with the precipitation solvent.

In some embodiments, the method further comprises concentrating the solution before combining the solution with the precipitation solvent, for example by vaporising a portion of the polar aprotic solvent.

In some embodiments, the method further comprises extracting the solution with an at least partially immiscible non-polar solvent, without causing precipitation, and separating the solution from an extractant liquid phase comprising the non-polar solvent before combining the solution with the precipitation solvent.

In some embodiments, the method further comprises recovering an additional amount of lithium electrolyte salt from the solvent mixture after the separating by cooling the solvent mixture and/or adding a further precipitation solvent to the solvent mixture.

In some embodiments, the method further comprises washing and/or drying the precipitated composition.

In some embodiments, the method further comprises dissolving the precipitated composition in an electrolyte solvent comprising carbonate. The carbonate molecules in the electrolyte solvent are preferably the same as those in the solvated lithium electrolyte salt in the precipitated composition.

In accordance with a second aspect the invention provides a method of recovering a lithium electrolyte salt from a used electrolyte, the method comprising: contacting a used electrolyte comprising a lithium electrolyte salt and electrolyte solvent with a polar aprotic solvent to produce a solution comprising the lithium electrolyte salt, the electrolyte solvent and the polar aprotic solvent, wherein at least one of the electrolyte solvent and the polar aprotic solvent comprises carbonate solvent; combining the solution with a precipitation solvent in which the lithium electrolyte salt is poorly soluble; precipitating a solid composition comprising the lithium electrolyte salt solvated by the carbonate solvent from a solvent mixture comprising the polar aprotic solvent, the precipitation solvent and the electrolyte solvent; and separating the solid composition from the solvent mixture.

In accordance with a third aspect the invention provides a method of recycling a lithium electrolyte salt from an electrochemical energy storage device, the method comprising: providing an electrochemical energy storage device, or a component or derivative thereof, comprising an electrolyte comprising a lithium electrolyte salt and electrolyte solvent; extracting the electrochemical energy storage device, or the component or derivative thereof, with a polar aprotic solvent to produce a solution comprising the lithium electrolyte salt, the electrolyte solvent and the polar aprotic solvent, wherein at least one of the electrolyte solvent and the polar aprotic solvent comprises carbonate solvent; combining the solution with a precipitation solvent in which the lithium electrolyte salt is poorly soluble; precipitating a precipitated composition comprising the lithium electrolyte salt solvated by the carbonate solvent from a solvent mixture comprising the polar aprotic solvent, the precipitation solvent and the electrolyte solvent, wherein the precipitated composition precipitates as a solid or as a liquid; and separating the precipitated composition from the solvent mixture.

In some embodiments of the third aspect, the precipitated composition precipitates as a solid.

In some embodiments of the third aspect, the method further comprises dissolving the precipitated composition in an electrolyte solvent comprising carbonate to produce an electrolyte for an electrochemical energy storage device. The carbonate molecules in the electrolyte solvent are preferably the same as those in the solvated lithium electrolyte salt in the precipitated composition.

In accordance with a fourth aspect the invention provides a method of recycling a lithium electrolyte salt from an electrochemical energy storage device, the method comprising: providing an electrochemical energy storage device, or a component or derivative thereof, comprising an electrolyte comprising a lithium electrolyte salt and electrolyte solvent; extracting the electrochemical energy storage device, or the component or derivative thereof, with a polar aprotic solvent to produce a solution comprising the lithium electrolyte salt, the electrolyte solvent and the polar aprotic solvent, wherein at least one of the electrolyte solvent and the polar aprotic solvent comprises carbonate solvent; combining the solution with a precipitation solvent in which the lithium electrolyte salt is poorly soluble; precipitating a solid composition comprising the lithium electrolyte salt solvated by the carbonate solvent from a solvent mixture comprising the polar aprotic solvent, the precipitation solvent and the electrolyte solvent; and separating the solid composition from the solvent mixture.

In accordance with a fifth aspect the invention provides a precipitated composition comprising a lithium electrolyte salt solvated by a carbonate solvent, produced by the method according to any embodiment of the first or third aspect.

In accordance with a sixth aspect the invention provides a method of producing an electrolyte for an electrochemical energy storage device, the method comprising: contacting a used electrolyte comprising a lithium electrolyte salt and a first electrolyte solvent with a polar aprotic solvent to produce a solution comprising the lithium electrolyte salt, the first electrolyte solvent and the polar aprotic solvent, wherein at least one of the first electrolyte solvent and the polar aprotic solvent comprises a first carbonate solvent; combining the solution with a precipitation solvent in which the lithium electrolyte salt is poorly soluble; precipitating a precipitated composition comprising the lithium electrolyte salt solvated by the first carbonate solvent from a solvent mixture comprising the polar aprotic solvent, the precipitation solvent and the first electrolyte solvent, wherein the precipitated composition precipitates as a solid or as a liquid; separating the precipitated composition from the solvent mixture; and dissolving the precipitated composition in a second electrolyte solvent comprising a second carbonate solvent to produce an electrolyte for an electrochemical energy storage device.

In some embodiments of the sixth aspect, the precipitated composition precipitates as a solid.

In accordance with a seventh aspect the invention provides a method of producing an electrolyte for an electrochemical energy storage device, the method comprising: contacting a used electrolyte comprising a lithium electrolyte salt and a first electrolyte solvent with a polar aprotic solvent to produce a solution comprising the lithium electrolyte salt, the first electrolyte solvent and the polar aprotic solvent, wherein at least one of the first electrolyte solvent and the polar aprotic solvent comprises a first carbonate solvent; combining the solution with a precipitation solvent in which the lithium electrolyte salt is poorly soluble; precipitating a solid composition comprising the lithium electrolyte salt solvated by the first carbonate solvent from a solvent mixture comprising the polar aprotic solvent, the precipitation solvent and the first electrolyte solvent; separating the solid composition from the solvent mixture; and dissolving the solid composition in a second electrolyte solvent comprising a second carbonate solvent to produce an electrolyte for an electrochemical energy storage device.

In accordance with an eighth aspect the invention provides an electrolyte for an electrochemical energy storage device, produced by the method according to any embodiment of the sixth or seventh aspect.

It will be appreciated that embodiments disclosed herein in relation to the first aspect of the invention are generally also relevant embodiments of the second, third, fourth, sixth and seventh aspects of the invention.

Where the terms "comprise", "comprises" and "comprising" are used in the specification (including the claims) they are to be interpreted as specifying the stated features, integers, steps or components, but not precluding the presence of one or more other features, integers, steps or components, or group thereof.

As used herein, the terms "first", "second", "third" etc in relation to various features of the disclosed devices are arbitrarily assigned and are merely intended to differentiate between two or more such features that the device may incorporate in various embodiments. The terms do not of themselves indicate any particular orientation or sequence. Moreover, it is to be understood that the presence of a "first" feature does not imply that a "second" feature is present, the presence of a "second" feature does not imply that a "first" feature is present, etc.

Further aspects of the invention appear below in the detailed description of the invention.

BRIEF DESCRIPTION OF DRAWINGS

Embodiments of the invention will herein be illustrated by way of example only with reference to the accompanying drawings in which.

DETAILED DESCRIPTION

Figure 1:
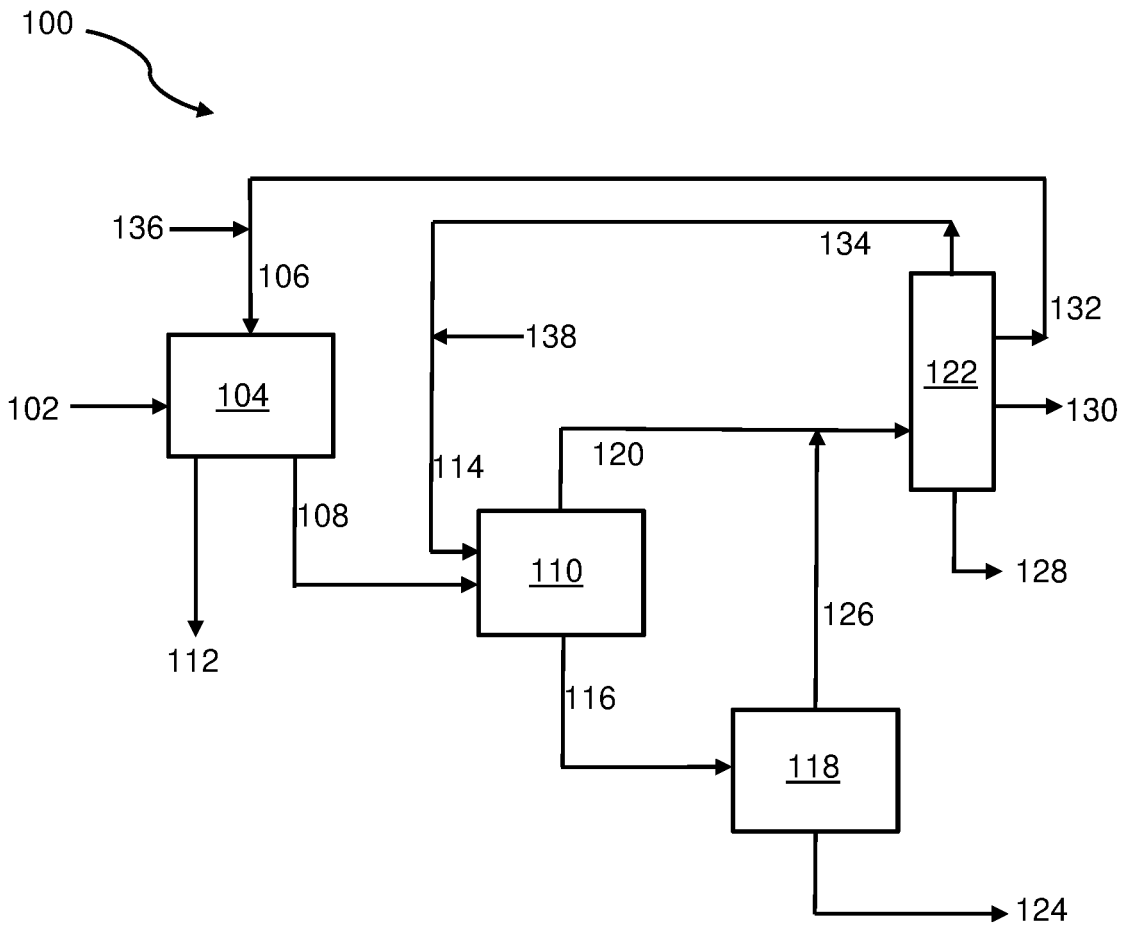
FIG. 1 is a block flow diagram of a process for performing a method according to an embodiment of the invention.

The present invention relates to a method of recovering a lithium electrolyte salt from a used electrolyte. The method includes a step of contacting a used electrolyte comprising a lithium electrolyte salt and electrolyte solvent with a polar aprotic solvent. A solution comprising the lithium electrolyte salt, the electrolyte solvent and the polar aprotic solvent is thus produced. At least one of the electrolyte solvent and the polar aprotic solvent comprises carbonate solvent.

The method further includes a step of combining the solution with a precipitation solvent in which the lithium electrolyte salt is poorly soluble. A precipitated composition, comprising the lithium electrolyte salt solvated by the carbonate solvent, is precipitated as a solid or a liquid from the mixture of polar aprotic solvent, precipitation solvent and electrolyte solvent. The precipitated composition is then separated from the solvent mixture.

Used Electrolytes

The methods of the invention may be used to recover a lithium electrolyte salt from a used electrolyte. As used herein, a used electrolyte refers to an electrolyte that has been placed in an electrochemical energy storage device. In most scenarios, the used electrolyte would have also been subjected to electrochemical cycling in the electrochemical energy storage device. The electrolyte may thus be an electrolyte for a lithium ion battery or other lithium-based energy storage device such as lithium-air batteries and lithium-ion capacitors.

Lithium electrolyte salts generally comprise lithium ions together with a weakly coordinating anion (WCA). $LiPF_6$ is by far the most common lithium electrolyte salt used in commercial lithium-ion batteries, and the methods of the invention are of particular interest for this material. However, a variety of lithium electrolyte salts suitable for electrochemical energy storage devices are known in the art, and it is envisaged that the methods may be used to recover any of these salts. Examples of such salts include $LiPF_6$, $LiBF_4$, lithium bis(fluorosulfonyl)imide (LiFSI), lithium bis(trifluoromethanesulfonyl)imide (LiTFSI), lithium (fluorosulfonyl)-(trifluoromethanesulfonyl)imide (LiFTFSI), lithium bis(oxalato)borate (LiBOB), lithium oxalyldifluoroborate (LiODFB), lithium fluoroalkylphosphate (LiFAP) and the like.

The used electrolyte comprises an electrolyte solvent in which the lithium electrolyte salt is at least partially dissolved. In some embodiments, the electrolyte solvent comprises carbonate solvent, which may optionally comprise a mixture of two or more organic carbonate (also known as carbonic acid ester) molecules. Common electrolytes for LIBs comprise a mixture of at least one cyclic carbonate selected from ethylene carbonate (EC) and propylene carbonate (PC) with at least one dialkyl carbonate selected from dimethyl carbonate (DMC), ethyl-methyl carbonate (EMC) and diethyl carbonate (DEC).

In some embodiments, the electrolyte solvent comprises EC, which is the most common carbonate in commercial lithium ion batteries. In some such embodiments, the EC is the only cyclic carbonate present. The inventors have found that high purity $LiPF_6$ solvated by EC, can be formed via the methods of the invention even when other carbonate solvents are present in solution when the $LiPF_6$ is precipitated. The recovered product of various experimental embodiments has been shown by analysis to be a Li-WCA solvate, e.g. a $LiPF_6$ solvate, which is exclusively solvated by EC. The $LiPF_6$ solvate is believed to have a stoichiometry of $Li(EC)_nPF_6$ where the average value of n is in the range of about 4 to 5.

While carbonate solvents are present in many commercial LIBs, it is not excluded that the electrolyte solvent comprises non-carbonate aprotic solvents and may in fact be free of carbonates. For example, the electrolyte solvent may comprise or consist of ether and/or ester solvents. Suitable ethers may include dialkylethers and glycol ethers. However, it will be appreciated that any non-carbonate solvents present should be relatively less coordinating to lithium ions than the carbonate solvents ultimately present during precipitation, such that a carbonate-solvated lithium salt product can be obtained.

The lithium electrolyte salt may be present in the used electrolyte at any concentration, but will typically be present at conventional concentrations suitable for electrolytes in lithium-based electrochemical energy storage devices. For example, the concentration may be below 4 M, for example between 0.1 and 2.0 M, such as between 0.5 and 1.5 M.

In some embodiments, the used electrolyte comprises degradation products. The degradation products may be degradation products of the weakly coordinating anion, for example the $PF_6^-$ anion, itself. This anion can degrade over time both due to inherent thermal instability and due to reactions with trace amounts of water which infiltrate the electrochemical energy storage device. The degradation products may thus include solid degradation products produced by exposure of the electrolyte to air and water. It has been found that such degradation products may be separated from the soluble lithium electrolyte salts in the methods of the invention, prior to the precipitation step. More soluble impurities can then be separated from the precipitate by filtration. Thus, high purity carbonate-solvated lithium salts can be produced despite the presence of typical impurities found in electrolytes of typical LIB waste.

Contacting the Used Electrolyte with a Polar Aprotic Solvent

The methods of the invention include a step of contacting the used electrolyte with a polar aprotic solvent to produce a solution comprising the lithium electrolyte salt, the electrolyte solvent and the polar aprotic solvent.

In some embodiments, the used electrolyte is present in an electrochemical energy storage device, or a component or post-use derivative thereof, when contacted with the polar aprotic solvent. Typically, the electrolyte in electrochemical energy storage devices is in intimate contact with one or more components of the device, such as the separator, cathode, the anode and the casing, so that it cannot simply be poured out of the spent device. As an initial step in the recycling process, the electrochemical energy storage device may thus be dismantled into separate components or physically broken up, for example by crushing, comminuting or shredding. Even so, the electrolyte may remain predominantly absorbed in or coated on the solid materials. The used electrolyte may thus be extracted from the solid components with the polar aprotic solvent, such that an acceptable degree of recovery is achieved.

It will be appreciated that the amount of polar aprotic solvent used to extract the used electrolyte should generally be minimised, subject to the requirement that an acceptable recovery of the lithium electrolyte salts should be achieved.

The polar aprotic solvent has sufficient polarity to extract the used electrolyte, thereby providing a solution in which the lithium electrolyte salt is dissolved in a liquid phase comprising both the polar aprotic solvent and electrolyte solvent. In some embodiments, the lithium electrolyte salt is soluble in the pure polar aprotic solvent. For example, the polar aprotic solvent may be able to solubilise at least 5 g, or at least 10 g of $LiPF_6$ per 100 g of the pure solvent at room temperature.

The polar aprotic solvent may comprise a carbonate solvent and/or a non-carbonate solvent. One consideration when using a non-carbonate polar aprotic solvent is that the solvent molecules should be relatively less coordinating to lithium ions than the carbonate solvents ultimately present during precipitation, such that a carbonate-solvated lithium salt product can be obtained. Suitable polar aprotic solvents to extract the used electrolyte may include ethers, esters and carbonate solvents.

In some embodiments, the polar aprotic solvent comprises, or consists of, carbonate solvent. In some embodiments, the polar aprotic solvent comprises a carbonate present in the electrolyte solvent, for example a non-cyclic dialkyl carbonate component of the electrolyte solvent. In some embodiments, the polar aprotic solvent comprises one or more of dimethyl carbonate (DMC), ethyl-methyl carbonate (EMC) and diethyl carbonate (DEC). These carbonates have the advantage of relatively low boiling points, which facilitates their recycling via distillation in a closed loop process. DMC, with the lowest boiling point, may thus be selected in some embodiments. Moreover, it has been found that high purity $LiPF_6$ which is selectively solvated by EC can be precipitated from solutions containing EC in combination with one or more of DMC, EMC and DEC.

In some embodiments, the polar aprotic solvent comprises EC, for example in combination with one or more of DMC, EMC and DEC. This may be particularly preferred if the electrolyte solvent lacks EC, or has insufficient EC, and the desired product of the process is an EC-solvated lithium electrolyte salt. Alternatively, in a closed loop process it may be convenient to allow components of the electrolyte solvent (such as EC) to build up to some acceptable level in the extracting polar aprotic solvent.

Once the electrolyte solvent is contacted with the polar aprotic solvent, the resulting solution may be subjected to one or more processing steps before precipitating the lithium electrolyte salt.

In some embodiments, the solution is concentrated (i.e. reduced in volume) prior to the precipitation, for example by a vaporisation technique such as simple distillation. This may be desirable in order to minimise the volume of liquid circulating in subsequent process steps, to provide a critical (minimum) concentration of the Li-salt in solution in the precipitation step, and/or to minimise the amount of the precipitation solvent required to achieve precipitation. The solvent removed in the concentration step, for example a low boiling carbonate such as DMC, EMC and/or DEC, may be recycled to form part of the polar aprotic solvent used in the extraction step.

In some embodiments, any solids present together with the solution, such as lithium salt degradation products or other particulate impurities derived from the electrochemical energy storage device, are separated from the solution. This may be done by filtration or other conventional solid-liquid separation technique.

In some embodiments, the solution is processed by extracting it with an at least partially immiscible solvent under conditions where lithium salt precipitation does not occur to any substantial extent. For example, the solution may be extracted with a non-polar solvent, such as a petroleum benzine, at a mixing ratio where insufficient amounts of non-polar solvent partition into the lithium-containing phase to induce precipitation. After agitating the two-phase mixture, the phases may then be separated by conventional liquid-liquid extraction liquid techniques, with the polar, lithium-containing phase proceeding to the subsequent precipitation step.

While not essential in the methods of the invention, a number of advantages may be obtained by this initial extraction step. In particular, it has been found that certain carbonate components, other than EC, such as the dialkyl carbonates DMC, EMC and DEC, may be selectively extracted into the low polarity phase while certain other carbonates, such as cyclic carbonates (EC and PC), remain to a greater extent in the lithium-containing solution phase. This extraction may facilitate the separation and recycling of the dialkyl carbonates in the process. Moreover, the concentration of specific carbonates in the lithium-containing solution favours the subsequent formation of desired lithium electrolyte salt products, in particular those which are predominantly or exclusively solvated with EC.

As disclosed herein, the solution immediately prior to precipitation comprises carbonate solvent, and in some embodiments ethylene carbonate. The carbonate solvent in the solution may originate from the electrolyte solvent in the used electrolyte, or from the polar aprotic solvent, or from both of these sources. It is also envisaged that carbonate solvent, such as EC, may be added to the solution and thus contacted with the used electrolyte after an initial extraction of electrolyte from the electrochemical energy storage device with other solvents.

Combining the Solution with a Precipitation Solvent

The methods of the invention include a step of combining the solution with a precipitation solvent in which the lithium electrolyte salt is poorly soluble. By poorly soluble, it is meant that the lithium electrolyte salt is insoluble or has a low solubility in the pure precipitation solvent. In particular, the solubility is low enough that the precipitation solvent acts as an antisolvent to the lithium electrolyte salt when added to the lithium-containing solution, thus contributing to the precipitation of the precipitated composition.

In some embodiments, the solution and the precipitation solvent are miscible under the conditions where they are combined, i.e. they combine to form a single-phase solvent mixture. However, it should be appreciated that the precipitation solvent and the solution need not be fully miscible under all conditions, such as all mixing ratios and temperatures, and indeed it is not required that a single liquid phase is formed when the precipitation solvent is combined with the solution. The inventors have found that precipitation can be induced even when a two-phase solvent mixture is formed. In such cases, it is believed that a sufficient quantity of the precipitation solvent partitions into the lithium-containing solution such that the lithium electrolyte salt precipitates therefrom. If not fully miscible, the precipitation solvent may thus be combined with the solution under conditions, such as mixing ratios and temperatures, whereby the precipitation solvent is sufficiently soluble in the lithium-containing solution that precipitation can be induced.

In some embodiments, the precipitation solvent precipitation solvent has lower polarity than the polar aprotic solvent. For example, the polar aprotic solvent may comprise carbonate solvent and the polar aprotic solvent comprises hydrocarbon solvent. However, it should be appreciated that the solubility of lithium electrolyte salts does not correlate directly with solvent polarity. For example, moderately polar solvents such as dichloromethane and chloroform have been found to be suitable as precipitation solvents, and may in principle be used when solvents of relatively lower polarity, such as ethers, are used as the polar aprotic solvent in the extraction.

In some embodiments, the precipitation solvent comprises a hydrocarbon solvent or a chlorinated solvent. Suitable hydrocarbon solvents may include aliphatic petroleum benzines of various boiling point ranges, for example petroleum benzine 40-60, 60-80 or 80-100, benzene, toluene and the like. Optionally, the hydrocarbon solvent may comprise at least a component of aromatic hydrocarbons, such as toluene, and/or cyclic hydrocarbons, such as cyclohexanes, which may provide a good balance between the requirements for miscibility with the lithium-containing solution and anti-solvency towards the lithium electrolyte salt. Suitable chlorinated solvents may include chlorohydrocarbons such as dichloromethane, chloroform and the like.

The mixing ratio between the solution and the precipitation solvent may be a relevant consideration in providing conditions suitable to induce precipitation. With particularly low polarity precipitation solvents, for example petroleum benzines, a mixing ratio of solution to precipitation solvent which is too high may result in a two-phase mixture with insufficient precipitation solvent partitioned into the lithium-containing phase. The lithium electrolyte salt may thus fail to precipitate sufficiently from the mixture. Accordingly, relatively low solution to precipitation solvent mixing ratios may be required to solubilise sufficient precipitation solvent in the lithium-containing phase and thus induce precipitation.

While it will be appreciated that suitable mixing ratio ranges will depend on the nature of the electrolyte solvent, polar aprotic solvent and precipitation solvent, in some embodiments the lithium-containing solution and the precipitation solvent are combined at a ratio (v/v) of between 1:2 and 1:100, such as between 1:3 and 1:20, for example between 1:4 and 1:15. For example, the inventors have found that good precipitation behaviour can be obtained at mixing ratios of below 1:2 (e.g. between 1:4 and 1:14) when using carbonate-based lithium salt solutions and toluene as precipitation solvent.

The combining of the solution with the precipitation solvent may involve adding the solution to the precipitation solvent or adding the precipitation solvent to the solution. Alternatively, the combination may take place in a continuous operation where both liquids are continuously or semi-continuously added to a precipitation vessel (or preliminary mixing vessel) maintained at a desired ratio of solvent components.

An advantage of the methods of the invention is that high temperatures and reduced pressures are not required. The combining of the lithium-containing solution and the precipitation solvent, and the subsequent precipitation, may thus be conducted at temperatures of below 50° C., or below 30° C., for example at or below ambient temperature. Thermal decomposition of the lithium electrolyte salt may thus be avoided or minimised. Moreover, the pressure may be maintained throughout at atmospheric pressure or above. It will be appreciated that inert conditions of low moisture content, and preferably also low oxygen content, should generally be maintained to avoid decomposition of the lithium electrolyte salts, and the avoidance of reduced pressures in the process lowers the probability of air or water ingress.

A further advantage of the methods of the invention is that the precipitation solvent need not have a boiling point higher than the solubilising solvents in the solution, since precipitation is typically not induced by distilling off the solubilising solvents. In some embodiments, therefore, the precipitation solvent has a lower boiling point than the carbonate solvent. Lower boiling precipitation solvents may be preferred as they can more easily be removed from the lithium electrolyte salt product and can be recovered and recycled more readily. The precipitation solvent may thus have a normal boiling point of below 120° C., or below 100° C. The precipitation solvent may be selected at least in part based on a boiling point difference from the other solvents in the process, such as the carbonates. This may allow the solvents to be separated by distillation and recycled in a closed loop process.

A further advantage of the invention is that the addition of hydrogen fluoride (HF) is not required to obtain good recovery of pure lithium electrolyte salts. Accordingly, in some embodiments, HF is not added to the process.

Precipitating a Precipitated Composition

The methods of the invention involve precipitating a precipitated composition comprising the lithium electrolyte salt solvated by the carbonate solvent. The precipitated composition is precipitated from the lithium-containing solution due, at least in part, to the presence of the precipitation solvent which acts as an antisolvent to the lithium electrolyte salt as described herein.

The precipitated composition may be either a solid or a liquid, depending for example on the weakly coordinating anion in the lithium electrolyte salt. In some embodiments, the precipitated composition comprises the lithium electrolyte salt solvated by the carbonate solvent in an amount of at least 50 wt. %, or at least 80 wt. %, or at least 90 wt. %, or substantially 100 wt. %.

In some embodiments, precipitation of the precipitated composition initiates immediately after the solution and the precipitation solvent are combined. It will be appreciated that such automatic precipitation behaviour may depend on the particular solvents present, their relative ratios and the temperature. In some embodiments, the solution and the precipitation solvent are combined at a temperature selected such that precipitation occurs automatically. For example, both liquids may be continuously or semi-continuously added to a precipitation vessel maintained at a suitable temperature to induce rapid precipitation. In some embodiments, ambient temperatures will be adequate to achieve this. However reduced temperatures may be required in some cases. For example, the temperature may be below 10° C., or below 0° C.

In some embodiments, precipitation of the precipitated composition may need to be actively induced after the combination. For example, the combined mixture of the lithium-containing solution and the precipitation solvent may be cooled, e.g. to temperatures below 10° C., or below 0° C. In some embodiments, precipitation may be induced by seeding the mixture with crystals of the desired lithium electrolyte salt product.

The precipitated composition which is precipitated comprises, and preferably consists essentially of, the lithium electrolyte salt in the form of a solvate including the carbonate solvent. It is a particular feature of the present invention that a solvent-free lithium electrolyte salt product is not targeted. Without wishing to be bound by any theory, it is believed that the solvent molecules in lithium electrolyte salt solvates coordinate to the lithium ions in the precipitated crystalline solid or ionic liquid. Thus, a variety of lithium electrolyte salts as disclosed herein may be precipitated as carbonate solvates by the methods of the invention.

The lithium electrolyte salt solvate comprises carbonates as at least a portion of the solvating solvent molecules. In some embodiments, the solid lithium electrolyte salt is solvated predominantly, or substantially entirely, by carbonate solvent molecules. As disclosed herein, a high proportion of carbonate in the solvate can be provided by ensuring that any other solvent molecules present in the solvent mixture are non-coordinating, or at least relatively less coordinating, to lithium ions than the carbonate solvents.

In some embodiments, the lithium electrolyte salt solvate comprises ethylene carbonate (EC) as at least a portion of the solvating solvent molecules. The EC may be present as the major, or indeed the only solvent molecule in the lithium electrolyte salt solvate. The lithium electrolyte salt solvate may thus comprise, or consist essentially of Li(EC)$_n$(WCA), where n represents the ratio of solvent to lithium in the solvate crystals and WCA is the weakly coordinating anion. As disclosed herein, it has surprisingly been found that high purity lithium electrolyte salt-EC solvates can be precipitated from solution by the methods of the invention even when other carbonate solvents are also present in solution.

In embodiments where the lithium electrolyte salt is $LiPF_6$, the precipitated composition may thus comprise $Li(EC)_nPF_6$. In at least some such embodiments, the average value of n is in the range of about 4 to 5.

Separating the Precipitated Composition

The methods of the invention include a step of separating the precipitated composition from the solvent mixture. If the precipitate is a solid, the separation may be accomplished by conventional solid-liquid separation techniques such as filtration, centrifugation and the like. If the precipitate is a liquid, the separation may be accomplished by conventional liquid-liquid separation techniques such as decantation, gravity separation and the like.

The separated precipitated composition may be washed once separated from the bulk of the solvent mixture. Washing may be desirable to remove any residual free solvent from the precipitate, in particular high boiling solvents such as free carbonates. The wash solvent may be the same as the precipitation solvent, or another non-polar solvent in which the lithium electrolyte salt is poorly soluble or insoluble. The wash solvent may be a low boiling solvent, such as petroleum benzine 40-60, to facilitate subsequent drying of the precipitate.

The separated precipitated composition may be dried to remove residual free solvent, optionally after first washing as disclosed herein. Drying may be accomplished at reduced pressures, but other techniques such as fluidisation in an inert gas are also envisaged.

The separated precipitated composition, after washing and drying, may comprise a high purity lithium electrolyte salt solvate having low levels of free solvent. Moreover, since the lithium electrolyte salt solvate comprises carbonate as the associated solvent, it may be suitable, without further purification, as a battery grade source of lithium salt for applications using a carbonate-based electrolyte. It has been found that a method according to the invention can provide lithium electrolyte salts solvated exclusively by carbonate molecules, in particular ethylene carbonate. The dissolution of such a product in an ethylene carbonate-containing electrolyte solvent is expected to produce a substantially identical composition to an electrolyte prepared by dissolving unsolvated lithium electrolyte salt in the same electrolyte solvent mixture. In some embodiments, therefore, the methods of the invention include a step of dissolving the recovered precipitated composition in an electrolyte solvent comprising carbonate.

The separated solvent mixture, comprising electrolyte solvent, polar aprotic solvent, precipitation solvent and any wash solvent may be further processed. In some embodiments, the initial recovery yield in the precipitation step is not quantitative, and an additional amount of lithium electrolyte salt may be recovered from the solvent mixture. This may be achieved by cooling the solvent mixture and/or adding a further amount of precipitation solvent to the solvent mixture. The solvent mixture may optionally be concentrated first, for example at reduced pressure.

The solvent mixture may be separated into different streams, for example by distillation. The polar aprotic solvent and the precipitation solvent in particular may be recovered and recycled in the process for reuse in the contacting/extraction steps and the combining/precipitation steps of the process. The electrolyte solvents may also be separated and removed from the process, either for reuse or for other disposal.

EMBODIMENTS

An embodiment of the invention will now be described with reference to FIG. 1, which depicts process 100. Lithium ion battery waste 102 includes an electrolyte comprising $LiPF_6$ dissolved in electrolyte solvent comprising ethylene carbonate and one or more dialkyl carbonates (e.g. ethylmethyl carbonate). Waste 102 is introduced to extraction unit 104, where it is extracted with carbonate-based polar aprotic solvent 106, for example a dialkyl carbonate such as dimethyl carbonate. Extracted solution 108, comprising $LiPF_6$ dissolved in mixed carbonate solvent, is optionally concentrated by simple distillation to remove a fraction of the dialkylcarbonate (not shown), optionally then filtered to remove residual solids (not shown) and then sent to precipitation unit 110. The extracted battery waste solids 112 are sent for pyrometallurgical or hydrometallurgical processing to recover the metal resources.

In precipitation unit 110, solution 108 is combined with precipitation solvent 114, which may be a low-polarity hydrocarbon or chlorinated solvent, for example a petroleum benzine. Solution 108 and precipitation solvent 114 are combined at mixing ratios and temperatures such that at least some of the precipitation solvent partitions into the lithium-containing solution. As a result of the antisolvent properties of the precipitation solvent, optionally assisted by low temperatures maintained in precipitation unit 110, a solid precipitate comprising $LiPF_6$ forms in precipitation unit 110. Precipitate 116 is sent from precipitation unit 110 to filtration unit 118. Optionally, lithium-lean solvent stream 120 is separately recovered from precipitation unit 110 and sent to solvent processing unit 122. Stream 120 may comprise a low polarity liquid phase, rich in the precipitation solvent, which may be formed if solution 108 and precipitation solvent 114 are not fully miscible. Alternatively, it may be a clarified stream obtained by decanting the mixed solvents from the precipitate if a single liquid phase is formed in precipitation unit 110.

Precipitate 116 is filtered in filtration unit 118 to remove residual solvent, washed with additional precipitation solvent (or other suitable wash solvent) and dried. Solid product 124, in the form of high purity $LiPF_6$ solvated by carbonate, is thus produced in process 100. Solid product 124 may be in the form of high purity $Li(EC)_nPF_6$, and is thus suitable to be reused in a battery electrolyte comprising an EC solvent matrix.

Filtrate 126 from filtration unit 118 is combined with stream 120 and sent to solvent processing unit 122. Optionally, stream 120, filtrate 126 or the combined stream may first be subjected to a further precipitation step (not shown) to recover addition $LiPF_6$. In solvent processing unit 122, which may comprise one or more conventional distillation processes, the mixture of solvents is separated into various streams, for example including heavies stream 128, electrolyte solvent recovery stream 130 (including ethylene carbonate), polar aprotic solvent recovery stream 132 (including e.g. the dialkyl carbonates) and precipitation solvent recovery stream 134 (comprising e.g. the petroleum benzine). Stream 132 may be recycled and supplemented with makeup stream 136 to form the polar aprotic solvent 106 used in extraction unit 104. Stream 134 may be recycled and supplemented with makeup stream 138 to form the precipitation solvent 114 used in precipitation unit 110.

In a variation, the electrolyte in lithium ion battery waste 102 comprises a different lithium salt, for example LiFSI or LiBF$_4$, such that a carbonate-solvated lithium salt precipitates as a liquid in precipitation unit 110. The liquid precipitate is then separated from the solvent mixture, either in precipitation unit 110 or in a downstream liquid-liquid separator 118. After washing and drying, product 124 in the form of high purity Li salt solvated by carbonate, is thus produced in process 100.

Figure 2:
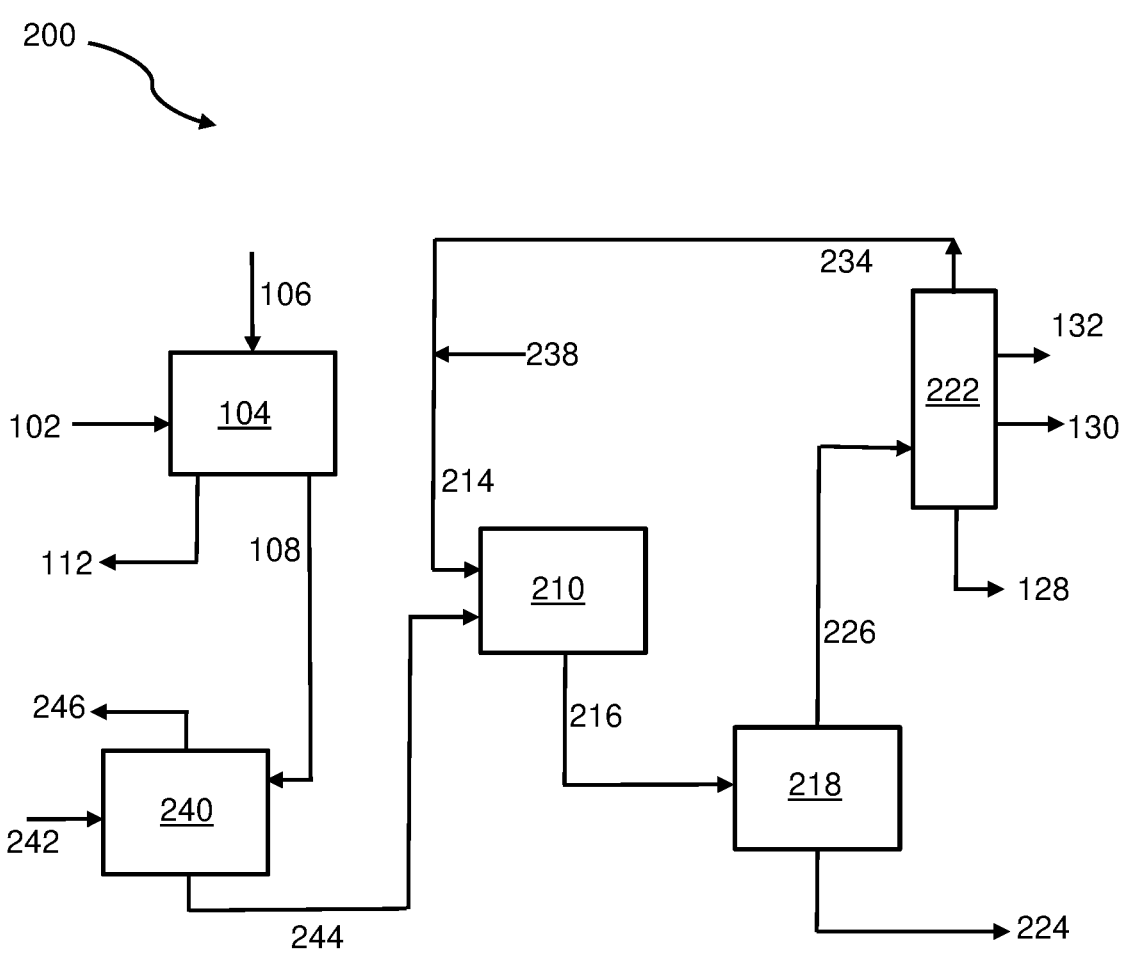
FIG. 2 is a block flow diagram of a process for performing a method according to another embodiment of the invention.

Another embodiment of the invention will now be described with reference to FIG. 2, which depicts process 200. Similarly numbered items in process 200 are as described herein for process 100 depicted in FIG. 1.

In process 200, however, extracted solution 108, comprising LiPF$_6$ dissolved in mixed carbonate solvent, is sent to liquid-liquid extraction unit 240, where it is extracted with non-polar solvent 242, such as a petroleum benzine. The extraction is conducted at conditions where precipitation of lithium salts is not induced. In particular, solution 108 and non-polar solvent 242 may be combined without cooling to below ambient temperature conditions, and/or at a relatively high mixing ratio (e.g. 1:1 v/v) such that relatively small amounts of the non-polar solvent partition into the polar, lithium-containing phase. The phases are then separated by a conventional liquid-liquid extraction technique in unit 240, with high-density, lithium-containing polar phase 244 proceeding to precipitation unit 210. Low-density, low-polarity phase 246 may be sent for further processing, with optional recycling of the non-polar solvent to stream 242. Advantageously, low-polarity phase 246 may comprise a significant fraction of the dialkyl carbonate, while leaving the more polar ethylene carbonate in polar phase 244. The removal of the dialkyl carbonate favours the formation of high purity ethylene carbonate-solvated LiPF$_6$ in the precipitation step, and may also facilitate the recovery and/or recycling of the various carbonate solvents in the process. In particular, the dialkyl carbonate may be recovered from stream 246 and recycled to stream 106.

In precipitation unit 210, polar phase 244 is combined with precipitation solvent 214, which may be a chlorinated solvent such as dichloromethane and which forms a single phase in precipitation unit 210. As a result of the antisolvent properties of the precipitation solvent, optionally assisted by the low temperatures maintained in precipitation unit 210, a solid precipitate comprising LiPF$_6$ is formed in precipitation unit 210. Precipitate 216 is sent from precipitation unit 210 to filtration unit 218 where it is filtered, washed and dried. Solid product 224, in the form of high purity LiPF$_6$ solvated by carbonate, in particular Li(EC)$_n$PF$_6$, is thus produced in process 200.

Filtrate 226 from filtration unit 218 is sent to solvent processing unit 222, where the mixture of solvents is processed and separated into various streams, for example including heavies stream 128, electrolyte solvent recovery stream 130 (including ethylene carbonate), polar aprotic solvent recovery stream 132 (including any dialkyl carbonate not removed in stream 246) and precipitation solvent recovery stream 234 (comprising the chlorinated solvent). Stream 234 may be recycled and supplemented with makeup stream 238 to form the precipitation solvent 214 used in precipitation unit 210.

Method of Producing an Electrolyte

The invention also relates to a method of producing an electrolyte for an electrochemical energy storage device. This method produces and then uses a precipitated lithium electrolyte salt composition, as described herein in the context of the methods of recovering lithium electrolyte salt from a used electrolyte, to produce an electrolyte.

The methods of producing an electrolyte include a step of dissolving the recovered precipitated composition in an electrolyte solvent comprising carbonate. In some embodiments, the electrolyte solvent comprises ethylene carbonate (EC), optionally in combination with one or more dialkyl carbonate. In some embodiments, the electrolyte solvent comprises EC in combination with dimethyl carbonate (DMC) and/or ethyl methyl carbonate (EMC).

As already disclosed herein, high purity lithium electrolyte salts solvated with carbonate molecules can be produced according to the invention. In some embodiments, the lithium electrolyte salt product is predominantly or exclusively solvated by carbonate molecules, in particular ethylene carbonate. The dissolution of such products in a carbonate-based electrolyte solvent is expected to produce a substantially identical composition to an electrolyte prepared by dissolving freshly synthesized or unsolvated lithium electrolyte salt in the same electrolyte solvent system. Thus, in some preferred embodiments, the carbonate solvent molecules which are present in the recovered lithium electrolyte salt solvate are the same carbonate solvent molecules desirably present in the newly prepared electrolyte solvent.

EXAMPLES

The present invention is described with reference to the following examples. It is to be understood that the examples are illustrative of and not limiting to the invention described herein.

Materials

Electrolyte formulations were sourced from commercial suppliers such as Soulbrain and Merck. The electrolytes used were 1.2 M LiPF$_6$ in EC/EMC (2:1 v/v), 1.2 M LiPF$_6$ in EC/EMC (3:7 v/v), 1 M LiPF$_6$ in EC/DEC (1:1 w/w), 1 M LiPF$_6$ in EC/PC (1:1 v/v) and 1 M LiPF$_6$ in EC/DMC (1:1 v/v). Non-aromatic petroleum benzines, petroleum benzine 40-60, petroleum benzine 60-80 and petroleum benzine 80-100, toluene, cyclohexane, dichloromethane and chloroform were purchased from commercial suppliers. Solvents not of anhydrous quality were dried over small pieces of metallic lithium.

Cathode material NMC811 and anode material Graphite-15% Silicon were obtained from Argonne National Laboratories (US) and dried under vacuum at the supplier recommended temperatures. Separator material Solupor 3P (20 μm thickness) was dried under vacuum at 40-50° C. for at least two days. Stainless steel coin cells 2032 with aluminium clad bottom case were purchased from Hohsen (Japan). Prior to battery assembly, all coin cell parts were cleaned in ethanol ultrasonically and subsequently dried in an oven at 60° C. for at least two days. Electrolyte formulations including lithium salts were manipulated in an argon filled glove box (Kiyon, Korea). Battery coin cells were assembled in the same glove box. Battery testing was performed on a Maccor (US) electrochemical test station at ambient temperature.

Example 1

Solutions of LiPF$_6$ (c.a. 1 to 1.2 M) in mixed carbonate solvents were maintained under inert atmosphere (N$_2$). The mixed carbonate solvents included ethylene carbonate (EC) in combination with one of dimethyl carbonate (DMC), ethyl-methyl carbonate (EMC), diethyl carbonate (DEC) and propylene carbonate (PC).

An amount of the electrolyte solution was then combined with a precipitation solvent (LiPF$_6$ antisolvent) at room temperature under inert atmosphere. The following precipitation solvents were evaluated: dichloromethane (CH$_2$Cl$_2$), chloroform (CHCl$_3$), toluene, petrol benzine 40-60, petrol benzine 60-80 and petrol benzine 80-100. The electrolyte solution and the low polarity solvent were combined at a ratio (v/v) of between about 1:11 and 1:14, adding the electrolyte solution (c.a. 0.4 ml) to the precipitation solvent (c.a. 4 ml) and briefly agitated. At these ratios, the solvents typically formed a single liquid phase from which a solid precipitate was observed to form. If precipitation did not occur immediately, the mixture was cooled in a fridge (~4° C.) or freezer (–17° C.) to induce precipitation. Fridge cooling was preferred in the case of hydrocarbon (toluene, cyclohexane) precipitation solvents. Some of the experiments were reproduced at larger scale, using 4 ml-30 ml of the electrolyte.

The experiments conducted, with observations of the precipitation, are shown in Table 1.

TABLE 1

| Test | Carbonate mixture | Precipitation solvent | Cooling | Observation |
|---|---|---|---|---|
| 1 | EC & EMC | CH$_2$Cl$_2$ | No | Slow precipitation |
| 2 | EC & DEC | CH$_2$Cl$_2$ | No | (increased rate of |
| 3 | EC & DMC | CH$_2$Cl$_2$ | No | precipitation |
|  |  |  |  | when cooled) |
| 4 | EC & PC | CH$_2$Cl$_2$ | Yes | Precipitation |
|  |  |  |  | when cooled |
| 5 | EC & EMC | CHCl$_3$ | No | Immediate |
| 6 | EC & DEC | CHCl$_3$ | No | precipitation |
| 7 | EC & DMC | CHCl$_3$ | No |  |
| 8 | EC & PC | CHCl$_3$ | No |  |
| 9 | EC & EMC | toluene | No | Rapid |
| 10 | EC & DEC | toluene | No | precipitation |
| 11 | EC & DMC | toluene | No |  |
| 12 | EC & PC | toluene[a] | Yes | Precipitation |
| 13 | EC & EMC | petrol benzine 40-60 | Yes | when cooled |
| 14 | EC & DEC | petrol benzine 40-60 | Yes |  |
| 15 | EC & DMC | petrol benzine 40-60 | Yes |  |
| 16 | EC & PC | petrol benzine 40-60 | Yes |  |
| 17 | EC & EMC | petrol benzine 60-80 | Yes |  |
| 18 | EC & PC | petrol benzine 60-80 | Yes |  |
| 19 | EC & EMC | petrol benzine 80-100 | Yes |  |
| 20 | EC & PC | petrol benzine 80-100 | Yes |  |

[a]two-phase mixture observed

Experiments 9-12 were repeated with the order of addition reversed, i.e. the toluene was added to the electrolyte solution (same volumes of each) while stirring. No difference in the precipitation behaviour was observed.

Once the solid product had precipitated, it was recovered from the mixed solvents by filtration under inert atmosphere. The filtered solids were washed with petrol benzine 40-60 and dried under vacuum or in a stream of dry N$_2$.

The composition of the recovered products was investigated by multinuclear NMR (H, C, P, F and Li). All NMR data was similar to that presented in Example 5 below, and thus consistent with the formation of an LiPF$_6$ ethylene carbonate solvate solvated exclusively by EC.

The recovered products from experiments 3 and 11 were subjected to elemental analysis, and the results are shown in Table 2 with comparison against calculated values for theoretical solvates. The elemental analysis results are consistent with the formation of Li(EC)$_n$PF$_6$ where the average value of n is in the range of about 4-5.

TABLE 2

| Salt from test | % C | % H | % N |
|---|---|---|---|
| 3 | 28.71 | 3.40 | <0.30 |
| 3 (repeat) | 28.57 | 3.50 | <0.30 |
| 11 | 28.98 | 3.62 | <0.30 |
| 11 (repeat) | 28.90 | 3.65 | <0.30 |
| Li(EC)$_4$PF$_6$ calculated | 28.60 | 3.20 | 0 |
| Li(EC)$_5$PF$_6$ calculated | 30.42 | 3.40 | 0 |

Example 2

The effect of varying the mixing ratio between the electrolyte solution and toluene was investigated using the 1.2 M LiPF$_6$ in mixed ethylene carbonate and ethyl-methyl carbonate (2:1 v/v). The electrolyte solution was added to the precipitation solvent without cooling. The experiments conducted, with observations of the precipitation, are shown in Table 3.

TABLE 3

| Test | Electrolyte volume (ml) | Toluene volume (ml) | Electrolyte to solvent ratio (v/v) | Observation |
|---|---|---|---|---|
| 21 | 1.5 | 14 | 1:9.3 | Rapid precipitation |
| 22 | 2 | 14 | 1:7 | Rapid precipitation |
| 23 | 3 | 14 | 1:4.7 | Rapid precipitation |
| 24 | 3.5 | 14 | 1:4 | Rapid precipitation |
| 25 | 7 | 14 | 1:2 | Partial precipitation |
| 26 | 14 | 14 | 1:1 | Minor fraction precipitated |

Example 3

LiPF$_6$ solutions in mixed carbonate solvents, as also used in Example 1, were subjected to a two-step solvent extraction-precipitation process. An amount of the electrolyte solution was mixed with petrol benzine 40-60 at room temperature under inert atmosphere at a ratio (v/v) of about 1:2. At this ratio, a two-phase mixture formed without precipitation of any solid. The mixture was then separated with a separating funnel (alternatively, by decantation) into a hydrocarbon-rich top phase and a carbonate-rich bottom phase.

The carbonate-rich bottom phase was then combined with dichloromethane at room temperature under inert atmosphere at a ratio (v/v) of about 1:3 while stirring. At this ratio the solvents formed a single liquid phase. Precipitation was typically induced at ambient temperatures, but the mixture was cooled in a freezer (–17° C.) to achieve a high precipitated yield.

The experiments conducted, with observations of the precipitation, are shown in Table 4.

TABLE 4

| Test | Carbonate mixture | Observation |
|---|---|---|
| 27 | EC & EMC | High yield of precipitate when cooled |
| 28 | EC & DEC | High yield of precipitate when cooled |
| 29 | EC & PC | Slow, low yield precipitation |

Once the solid product had precipitated, it was recovered from the mixed solvents by filtration under inert atmosphere. The filtered solids were washed with petrol benzine 40-60 and dried under vacuum or in a stream of dry N$_2$. The composition of the recovered products was investigated by multinuclear NMR (H, C, P, F and Li). All NMR data was similar to that presented in Example 5 below, and thus consistent with the formation of an $LiPF_6$ ethylene carbonate solvate solvated exclusively by EC.

For each experiment, the filtrate and the hydrocarbon-rich top phase were analysed by NMR. The ethylene carbonate was predominantly present in the filtrate, indicating it had partitioned into the carbonate-rich bottom phase during the first solvent extraction phase. However, for tests 27 and 28, the second carbonate (EMC or DEC) had distributed predominantly into the hydrocarbon-rich top phase.

Example 4

A solution of 1.2 M $LiPF_6$ in a mixed ethylene carbonate and ethyl-methyl carbonate was exposed to air, causing decomposition of a portion of the $LiPF_6$ by reaction with oxygen and water. Solid decomposition products of $LiPF_6$ were observed precipitating from the solution.

The electrolyte was then filtered through a membrane filter to remove the solids, and the filtered electrolyte solution was then subjected to the same two-step solvent extraction-precipitation process as test 27 of Example 3. The resultant solid product was analysed by NMR and found to be of the same purity as the product of test 27.

Example 5

An electrolyte solution 1.2 M $LiPF_6$ in EC/EMC (2:1 v/v) was combined with toluene in a 1:8 (v/v) ratio, resulting in precipitation of a solid product. The solid product was recovered from the mixed solvents by filtration under inert atmosphere, and the mother liquor was sampled for analysis. The filtered solids were then washed with petrol benzine 40-60 and dried under vacuum.

The composition of the recovered product was investigated by multinuclear NMR—$\delta$/ppm, multiplicity: $^1$H-NMR: 4.45, s; $^{31}$P-NMR: −144.66, sept.; $^{19}$F-NMR: −73.94, d; $^{13}$C-NMR: 65.04, 156; $^7$Li-NMR: 2.49, s. The NMR data is consistent with the formation of $Li(EC)_nPF_6$.

The mother liquor was also analysed by NMR, with the results showing the presence of the expected solvents (EC, EMC, toluene) but little or no phosphorous or fluorine species (NMR signals low or indistinguishable from the baseline).

Another electrolyte solution 1.2 M $LiPF_6$ in EC/EMC (3:7 v/v) was mixed with petroleum benzene 40-60 in a 1:1.5 (v/v) ratio. A two-phase mixture was formed, and no precipitation was observed. The phases were separated, with the non-polar phase retained for analysis. Dichloromethane was added to the electrolyte phase in a 1:3 (v/v) ratio causing precipitation of a solid. The solid product was recovered from the mixed solvents by filtration under inert atmosphere. The filtered solids were then washed with petrol benzine 40-60 and dried under vacuum.

The composition of the recovered product was investigated by multinuclear NMR –$\delta$/ppm, multiplicity: $^1$H-NMR: 4.45, s; $^{31}$P-NMR: −144.65, sept. (and trace impurity at −20, t); $^{19}$F-NMR: −73.94, d (and trace impurity at −84, d); $^{13}$C-NMR: 65.26, 157; $^7$Li-NMR: 2.24, s. The NMR data is consistent with the formation of $Li(EC)_nPF_6$.

The non-polar petrol benzine phase from the initial extraction was also analysed by NMR, with the results showing the presence of EMC and only trace amounts of EC, indicating selective extraction of EMC from the electrolyte phase. It was estimated that EC formed as little as 1 wt. % of the total carbonate extracted into the non-polar phase. No phosphorous or fluorine species were identified (NMR signals low or indistinguishable from the baseline).

Example 6

Test 22 (per Example 2; Table 3) was repeated except at significantly larger scale, using 25 ml of 1.2 M $LiPF_6$ in EC/EMC (2:1 v/v). After addition of the electrolyte to toluene (approx. 1:7.5 v/v of electrolyte:solvent), formation of a precipitate was observed which increased upon standing at room temperature for several hours. After recovery of the precipitate by the method of Example 3, approximately 14-15 g of $Li(EC)_nPF_6$ were isolated.

Example 7

Precipitation experiments were conducted with more dilute electrolyte solutions. The undiluted initial electrolyte was 1.2 M $LiPF_6$ in mixed EC and EMC (2:1 v/v). This initial electrolyte was then diluted with DMC before precipitation with toluene and recovery of the solid precipitate according to the methods of Example 3. Tests 30-32 were thus performed using the undiluted electrolyte volumes, ratios of electrolyte to dilution solvent and toluene precipitant volumes shown in Table 5. NMR analysis confirmed that the solid precipitate was $Li(EC)_nPF_6$, despite the presence of EMC and DMC (only in test 32 was a minor amount of DMC detected, probably due to insufficient washing). The mass of solid $Li(EC)_nPF_6$ recovered in each test is also shown in Table 5. The results demonstrate that lithium electrolyte salts can be satisfactorily recovered from diluted electrolytes which simulate a scenario when a used electrolyte (containing lithium salts at typical battery concentrations) is extracted (leached) from a spent battery using a polar aprotic extraction solvent, such as a carbonate.

TABLE 5

| Test | Undiluted Electrolyte (ml) | DMC diluent (ml) | Electrolyte:DMC (v/v) | Toluene precipitant (ml) | $Li(EC)_nPF_6$ Yield (g) |
|---|---|---|---|---|---|
| 30 | 4 | 4 | 1:1 | 60 | 2.31 |
| 31 | 6 | 12 | 1:2 | 135 | 3.11 |
| 32 | 9 | 36 | 1:4 | 338 | 3.9 |

Example 8

Recovery of other lithium electrolyte salts was investigated using 1.2 M solutions of $LiBF_4$ and LiFSI (FSI=bis (fluorosulfonyl)imide) in EC:DMC (2:1 v/v). The electrolytes (2 ml) were combined with toluene (toluene:electrolyte solution 7.5:1 v/v). In both cases, a liquid two-phase system formed immediately after the addition of the electrolyte to the toluene. The liquid precipitate was separated from the supernatant solvent, and both phases were analysed by multinuclear NMR spectroscopy. The solvent phase contained no residual lithium salt, confirming quantitative precipitation.

Figure 5:
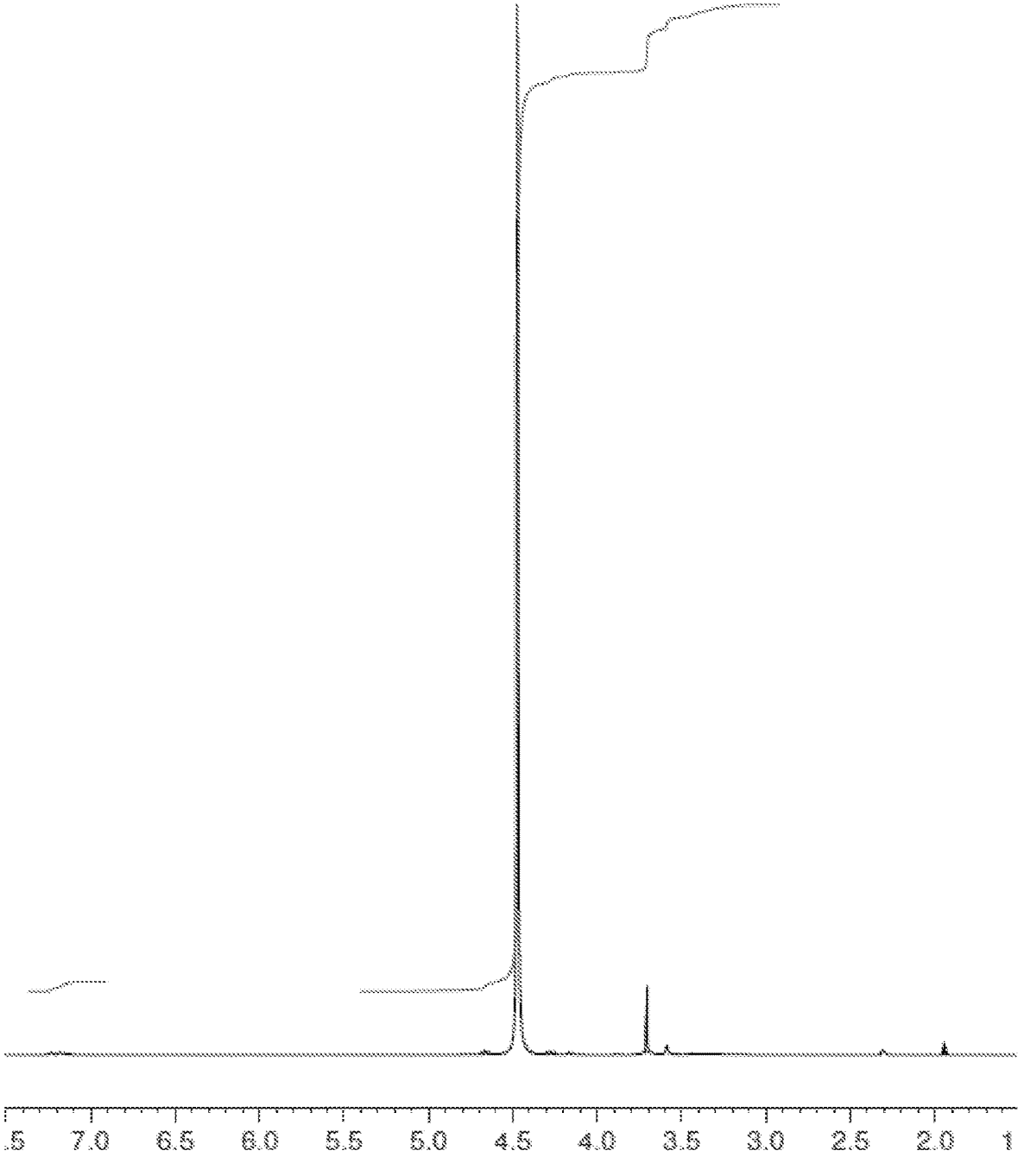
FIG. 5 is an $^1H$ NMR spectrum of $Li(EC)_nBF_4$ recovered from a carbonate-based electrolyte in Example 8.

The precipitated liquid was identified by NMR as the Li salt solvated (complexed) by EC, i.e. having the formula $[Li(EC)_n][A]$ (A=$BF_4$, FSI]. $[Li(EC)_n][BF_4]$ NMR—$\delta$/ppm, multiplicity: $^1$H-NMR: 4.48, s; $^{11}$B NMR −1.4, s; $^{19}$F NMR −153, s. The NMR spectrum of the recovered $[Li(EC)_n]$ $[BF_4]$ is shown in FIG. 5, demonstrating that the recovered lithium salt product contains ethylene carbonate as the predominant solvating molecule.

Example 9

The performance of recovered lithium electrolyte salts in battery applications was evaluated in electrochemical charge-discharge tests. The $Li(EC)_nPF_6$ materials produced in Examples 5 and 6 were thus dissolved in DEC, then adding EC and small amounts of solid electrolyte interface-forming additives (5 wt. % fluoroethylene carbonate and 5 wt. % vinylene carbonate) to formulate approximately 1 M $LiPF_6$ in EC/DEC (3:7 v/v) electrolyte solutions, which are representative of electrolytes commonly used in commercial LIBs. A benchmark commercial electrolyte, 1.2 M $LiPF_6$ in EC/EMC (3:7 v/v) plus proprietary battery additives, was used for comparison. These electrolyte solutions were then encapsulated in standard coin cell configurations containing a commercial NMC 811 cathode, a graphite-silicon (Si 15%) anode and a Solupor 3P separator membrane.

Figure 3:
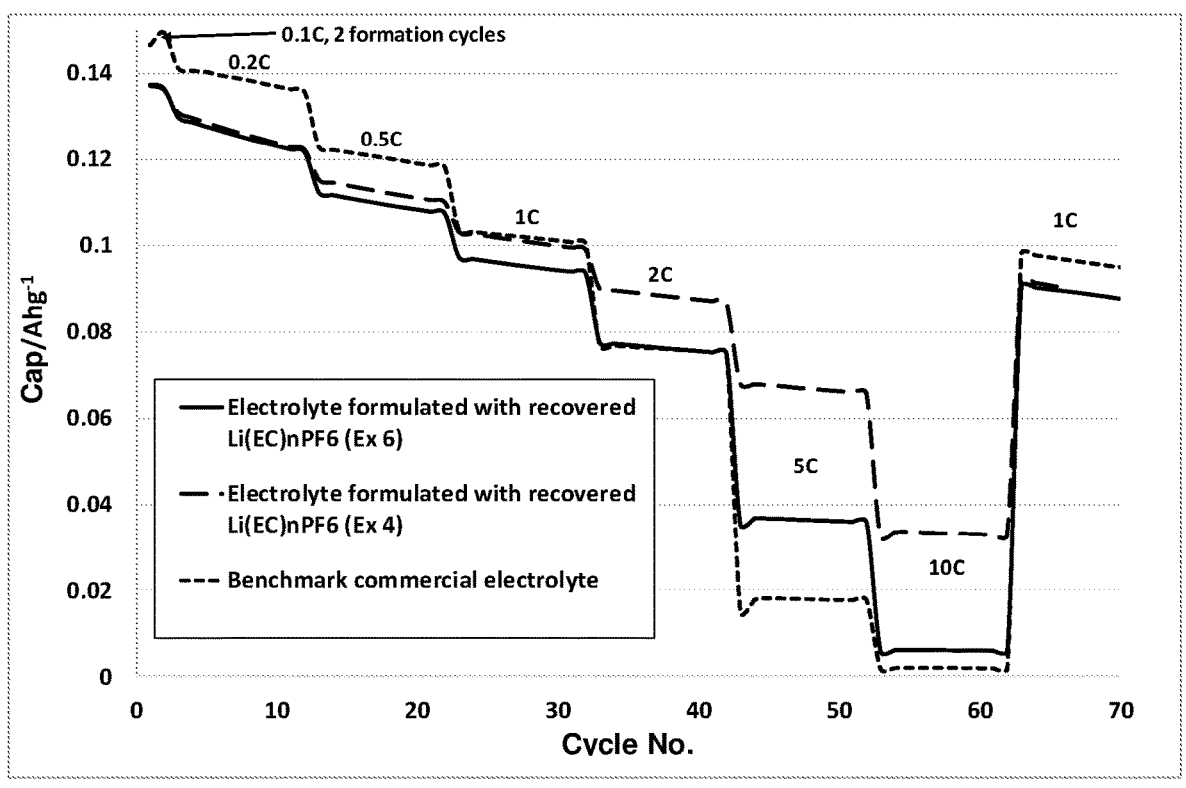
FIG. 3 shows discharge capacity as a function of cycle number and discharge rate for LIB battery cells using electrolyte formulated with $Li(EC)_nPF_6$ recovered in Examples 6 and 4, with comparison against a commercial $LiPF_6$ electrolyte, as measured in Example 9.
Figure 4:
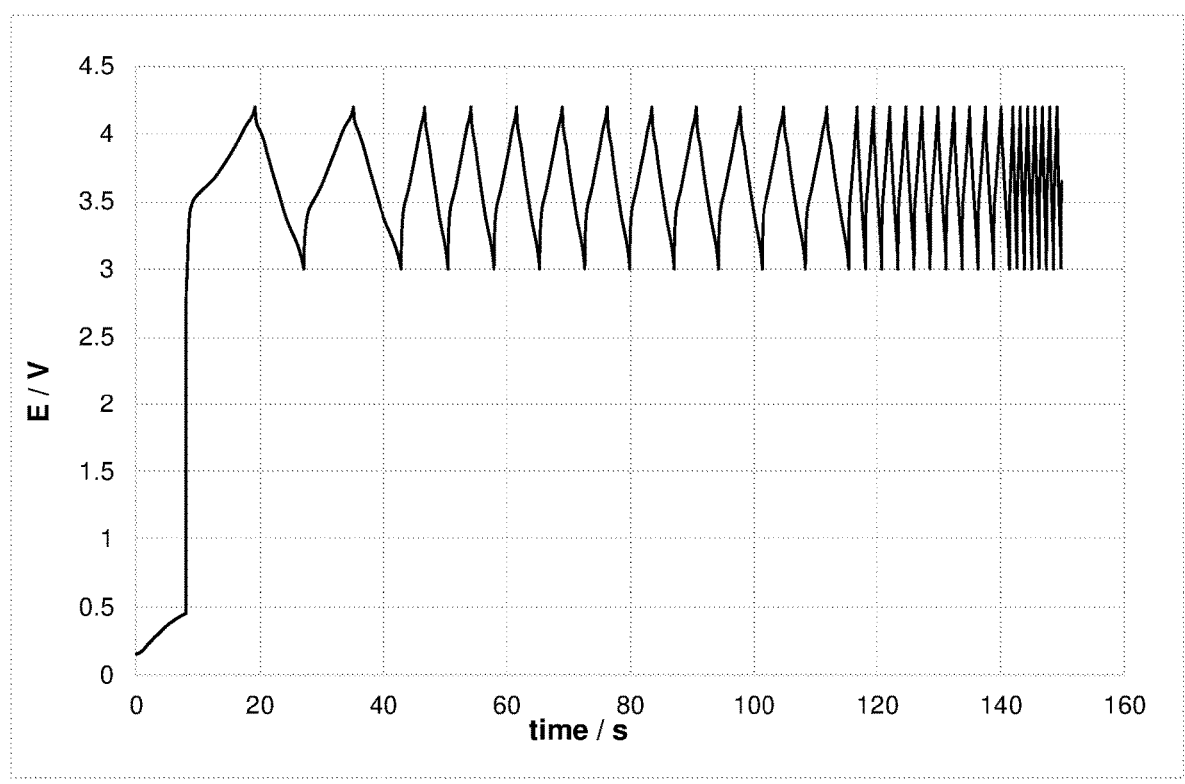
FIG. 4 shows the voltage-time profile of the LIB battery cell using electrolyte formulated with $Li(EC)_nPF_6$ recovered in Example 6, as measured in Example 9.

The coin cells were cycled according to a rate-test cycling profile at ambient temperature, with discharge rates (C-values) between 0.2 and 10 C. The battery cycling results are depicted in FIGS. 3 and 4. FIG. 3 shows that electrolytes formulated with recovered $Li(EC)_nPF_6$, including from degraded electrolytes (Example 5) provide comparable cycling performance to the commercial benchmark, with the minor differences attributed to the different solvent system and additives. FIG. 4 shows the voltage-time profile of the LIB battery cell made using the electrolyte containing recovered $Li(EC)_nPF_6$. The results are typical of LIB batteries with NMC cathode material.

$Li(EC)_nPF_6$ produced in Example 7 test 31 was also dissolved in DEC, then adding EC and small amounts of solid electrolyte interface-forming additives to formulate an approximately 1 M $LiPF_6$ in EC/DEC (3:7 v/v) electrolyte solution. Good cycling performance, as measured in electrochemical charge-discharge tests at C values ranging between 0.1 C and 2 C, was obtained, thus demonstrating successful recovery of lithium electrolyte salts from dilute electrolytes.

Those skilled in the art will appreciate that the invention described herein is susceptible to variations and modifications other than those specifically described. It is understood that the invention includes all such variations and modifications which fall within the spirit and scope of the present invention.

The invention claimed is:

1. A method of recovering a lithium electrolyte salt from a used electrolyte, the method comprising:
   contacting a used electrolyte comprising a first lithium electrolyte salt and an electrolyte solvent with a polar aprotic solvent to produce a solution comprising the first lithium electrolyte salt, the electrolyte solvent, and the polar aprotic solvent, wherein at least one of the electrolyte solvent and the polar aprotic solvent comprises carbonate solvent;
   combining the solution with a precipitation solvent in which the first lithium electrolyte salt is poorly soluble;
   precipitating a precipitated composition comprising the first lithium electrolyte salt solvated by the carbonate solvent from a solvent mixture comprising the polar aprotic solvent, the precipitation solvent, and the electrolyte solvent, wherein the precipitated composition precipitates as a solid or as a liquid; and
   separating the precipitated composition from the solvent mixture;

wherein the used electrolyte has been placed in an electrochemical energy storage device prior to contacting the used electrolyte with the polar aprotic solvent.

2. The method according to claim 1, wherein the precipitated composition precipitates as a solid.

3. The method according to claim 1, wherein the first lithium electrolyte salt is $LiPF_6$.

4. The method according to claim 1, wherein both the electrolyte solvent and the polar aprotic solvent comprise carbonate solvent.

5. The method according to claim 1, wherein at least one of the electrolyte solvent and the polar aprotic solvent comprises ethylene carbonate.

6. The method according to claim 5, wherein the electrolyte solvent comprises ethylene carbonate, and wherein the polar aprotic solvent comprises at least one selected from dimethyl carbonate, ethyl methyl carbonate, and diethyl carbonate.

7. The method according to claim 5, wherein the precipitated composition comprises $Li(ethylene\ carbonate)_nPF_6$, wherein the average value of n is in the range of about 4 to 5.

8. The method according to claim 1, wherein the used electrolyte is present in the electrochemical energy storage device, or a component or derivative thereof, and wherein contacting the used electrolyte with the polar aprotic solvent comprises extracting the electrochemical energy storage device, or the component or derivative thereof, with the polar aprotic solvent.

9. The method according to claim 1, wherein the precipitation solvent comprises a hydrocarbon solvent or a chlorinated solvent.

10. The method according to claim 1, wherein the precipitation solvent has a normal boiling point of below 120° C.

11. The method according to claim 1, wherein the combining and the precipitating are conducted at temperatures below 50° C.

12. The method according to claim 1, wherein precipitating the precipitated composition comprises cooling the solvent mixture to a temperature below 10° C.

13. The method according to claim 1, further comprising concentrating the solution before combining the solution with the precipitation solvent.

14. The method according to claim 1, further comprising extracting the solution with an at least partially immiscible non-polar solvent and separating the solution from an extractant liquid phase comprising the non-polar solvent before combining the solution with the precipitation solvent.

15. A method of recycling a lithium electrolyte salt from an electrochemical energy storage device, the method comprising:
   providing an electrochemical energy storage device, or a component or derivative thereof, comprising an electrolyte comprising a first lithium electrolyte salt and an electrolyte solvent;
   extracting the electrochemical energy storage device, or the component or derivative thereof, with a polar aprotic solvent to produce a solution comprising the first lithium electrolyte salt, the electrolyte solvent, and the polar aprotic solvent, wherein at least one of the electrolyte solvent and the polar aprotic solvent comprises a carbonate solvent;
   combining the solution with a precipitation solvent in which the first lithium electrolyte salt is poorly soluble;
   precipitating a precipitated composition comprising the first lithium electrolyte salt solvated by the carbonate solvent from a solvent mixture comprising the polar aprotic solvent, the precipitation solvent, and the electrolyte solvent, wherein the precipitated composition precipitates as a solid or as a liquid; and separating the precipitated composition from the solvent mixture;

wherein the used electrolyte has been placed in an electrochemical energy storage device prior to contacting the used electrolyte with the polar aprotic solvent.

16. The method according to claim 15, wherein the precipitated composition precipitates a solid.

17. The method according to claim 15, further comprising dissolving the precipitated composition in an electrolyte solvent comprising carbonate to produce an electrolyte for an electrochemical energy storage device.

18. A method of producing an electrolyte for an electrochemical energy storage device, the method comprising:

contacting used electrolyte comprising a first lithium electrolyte salt and a first electrolyte solvent with a polar aprotic solvent to produce a solution comprising the first lithium electrolyte salt, the first electrolyte solvent, and the polar aprotic solvent, wherein at least one of the first electrolyte solvent and the polar aprotic solvent comprises a first carbonate solvent;

combining the solution with a precipitation solvent in which the first lithium electrolyte salt is poorly soluble;

precipitating a precipitated composition comprising the first lithium electrolyte salt solvated by the first carbonate solvent from a solvent mixture comprising the polar aprotic solvent, the precipitation solvent, and the first electrolyte solvent, wherein the precipitated composition precipitates as a solid or as a liquid;

separating the precipitated composition from the solvent mixture; and dissolving the precipitated composition in a second electrolyte solvent comprising a second carbonate solvent to produce an electrolyte for an electrochemical energy storage device;

wherein the used electrolyte has been placed in an electrochemical energy storage device prior to contacting the used electrolyte with the polar aprotic solvent.

19. The method according to claim 18, wherein the precipitated composition precipitates as a solid.

20. The method according to claim 1, wherein, prior to contacting the used electrolyte with the polar aprotic solvent, the electrochemical energy storage device, or a component or derivative thereof, is dismantled or physically broken up.

21. The method according to claim 20, wherein the electrochemical energy storage device, or the component or derivative thereof, is crushed, comminuted, or shredded.

22. The method according to claim 1, wherein the solution is subjected to one or more processing steps after contacting the used electrolyte with the polar aprotic solvent and before combining the solution with the precipitation solvent.

23. The method according to claim 22, wherein the one or more processing steps comprise removing impurities from the solution prior to precipitation of the first lithium electrolyte salt.

24. The method of claim 15, wherein the electrochemical energy storage device, or a component or derivative thereof comprises a crushed, comminuted, or shredded electrochemical energy storage device.

25. The method according to claim 15, further comprising removing impurities from the solution prior to precipitating the first lithium electrolyte salt.

26. The method according to claim 18, further comprising removing impurities from the solution prior to precipitating the first lithium electrolyte salt.

* * * * *